(12) United States Patent
Kim et al.

(10) Patent No.: US 10,031,380 B2
(45) Date of Patent: Jul. 24, 2018

(54) LIQUID CRYSTAL DISPLAY DEVICE COMPRISING A COMMON ELECTRODE HAVING A FIRST STEM PORTION AND A BRANCH PORTION EACH SURROUNDED BY AN ELECTRIC FIELD FORMING PORTION

(71) Applicant: Samsung Display Co. Ltd., Yongin-si (KR)

(72) Inventors: Hoon Kim, Ansan-si (KR); Ki Chul Shin, Seongnam-si (KR); Ho Kil Oh, Seoul (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 8 days.

(21) Appl. No.: 15/408,586

(22) Filed: Jan. 18, 2017

(65) Prior Publication Data

US 2017/0322463 A1 Nov. 9, 2017

(30) Foreign Application Priority Data

May 3, 2016 (KR) .......................... 10-2016-0054472

(51) Int. Cl.
*G02F 1/1343* (2006.01)
*G02F 1/1335* (2006.01)
*G02F 1/1362* (2006.01)

(52) U.S. Cl.
CPC .... *G02F 1/134309* (2013.01); *G02F 1/13439* (2013.01); *G02F 1/133512* (2013.01);
(Continued)

(58) Field of Classification Search
CPC ..... G02F 2001/134372; G02F 2203/01; G02F 2201/121
See application file for complete search history.

(56) References Cited

U.S. PATENT DOCUMENTS

2012/0281173 A1* 11/2012 Kwon ............... G02F 1/133707
349/123
2012/0307172 A1* 12/2012 Yoshida ............ G02F 1/133707
349/43

(Continued)

FOREIGN PATENT DOCUMENTS

| KR | 1020130091218 | 8/2013 |
| KR | 1020150026641 | 3/2015 |
| KR | 1020150101058 | 9/2015 |

*Primary Examiner* — Paul Lee
(74) *Attorney, Agent, or Firm* — Cantor Colburn LLP

(57) ABSTRACT

A liquid crystal display device includes: a first substrate; a pixel electrode including a first sub-pixel electrode and disposed on the first substrate; a second substrate facing the first substrate; and a common electrode including an electric field forming portion and a first slit portion, and disposed on the second substrate. The electric field forming portion includes a transparent conductive material. The first slit portion includes a first stem portion extending in a first direction, a second stem portion extending in a second direction different from the first direction and crossing the first stem portion, and a branch portion extending in the first direction and located on at least one of two opposing sides in a longitudinal direction of the second stem portion. Each of the first stem portion and the branch portion has a linear shape surrounded by the electric field forming portion.

20 Claims, 17 Drawing Sheets

(52) U.S. Cl.
CPC .. *G02F 1/133514* (2013.01); *G02F 1/136286* (2013.01); *G02F 2001/134345* (2013.01); *G02F 2001/134372* (2013.01); *G02F 2201/121* (2013.01); *G02F 2201/123* (2013.01); *G02F 2203/01* (2013.01)

(56) References Cited

U.S. PATENT DOCUMENTS

| | | | |
|---|---|---|---|
| 2013/0101755 A1* | 4/2013 | Lee | G02F 1/133707 428/1.23 |
| 2015/0116620 A1* | 4/2015 | Song | G02F 1/134309 349/43 |
| 2015/0146126 A1* | 5/2015 | Shin | G02F 1/134309 349/43 |
| 2015/0160524 A1* | 6/2015 | Shin | G02F 1/136213 349/42 |
| 2015/0185534 A1* | 7/2015 | Park | G02F 1/13624 349/34 |
| 2015/0198837 A1* | 7/2015 | Kim | G02F 1/133707 349/43 |
| 2015/0198851 A1* | 7/2015 | Park | G02F 1/134309 349/46 |
| 2015/0268517 A1* | 9/2015 | Song | G02F 1/134309 349/43 |
| 2015/0309375 A1* | 10/2015 | Chang | G02F 1/134309 349/33 |
| 2015/0316821 A1* | 11/2015 | Lee | G02F 1/133707 349/33 |
| 2015/0323847 A1 | 11/2015 | Kim et al. | |

\* cited by examiner

LIQUID CRYSTAL DISPLAY DEVICE COMPRISING A COMMON ELECTRODE HAVING A FIRST STEM PORTION AND A BRANCH PORTION EACH SURROUNDED BY AN ELECTRIC FIELD FORMING PORTION

This application claims priority to Korean Patent Application No. 10-2016-0054472, filed on May 3, 2016, and all the benefits accruing therefrom under 35 U.S.C. 119, the content of which in its entirety is herein incorporated by reference.

BACKGROUND

1. Technical Field

Exemplary embodiments of the invention relate to a liquid crystal display device.

2. Description of the Related Art

A display device is gaining more importance with the development of multimedia. In order to meet various demands, various types of display devices such as a liquid crystal display device ("LCD") and an organic light emitting display ("OLED") are used.

The liquid crystal display device is one of the most widely used types of flat panel display device, and typically includes two substrates on which field generating electrodes such as a pixel electrode and a common electrode are provided, and a liquid crystal layer interposed between the two substrates. The liquid crystal display device generates an electric field in the liquid crystal layer by applying a voltage to the field generating electrodes, and displays an image by determining the orientation direction of the liquid crystal molecules of the liquid crystal layer and controlling the polarization of incident light.

A vertical alignment type liquid crystal display device controls the inclination direction of the liquid crystal molecules by providing a slit pattern in the field generating electrode.

SUMMARY

Exemplary embodiments of the invention relate to a liquid crystal display device with reduced lateral image quality degradation due to an electric field generated between a common electrode and an edge of a pixel electrode.

In such an embodiment of a liquid crystal display device, lateral visibility may be effectively prevented from being reduced due to an electric field generated between a common electrode and an edge of a pixel electrode.

The effects of exemplary embodiments of the invention are not limited to the above-described effect and other effects which are not described herein will become apparent to those skilled in the art from the following description.

In an exemplary embodiment of the invention, a liquid crystal display device includes: a first substrate; a pixel electrode including a first sub-pixel electrode disposed on the first substrate; a second substrate facing the first substrate; and a common electrode including an electric field forming portion and a first slit portion disposed on the second substrate. In such an embodiment, the electric field forming portion includes a transparent conductive material. In such an embodiment, the first slit portion includes a first stem portion extending in a first direction, a second stem portion extending in a second direction, which is different from the first direction, and crossing the first stem portion, and a branch portion extending in the first direction and located on at least one of two opposing sides in a longitudinal direction of the second stem portion. In such an embodiment, each of the first stem portion and the branch portion has a linear shape surrounded by the electric field forming portion.

In another exemplary embodiment of the invention, a liquid crystal display device includes: a first substrate; a pixel electrode disposed on the first substrate in a first direction and including first and second sub-pixel electrodes adjacent to each other; a second substrate facing the first substrate; and a common electrode disposed on the second substrate and including an electric field forming portion including a transparent conductive material, a first slit portion overlapping the first sub-pixel electrode, and a second slit portion overlapping the second sub-pixel electrode. In such an embodiment, each of the first and second slit portions includes a first stem portion extending in the first direction and a second stem portion extending in a second direction, which is different from the first direction, and crossing the first stem portion. In such an embodiment, at least one of the first and second slit portions further includes a first branch portion extending in the first direction and located on at least one of two opposing sides in a longitudinal direction of the second stem portion of the at least one of the first and second slit portions. In such an embodiment, each of the first stem portion and the first branch portion has a linear shape surrounded by the electric field forming portion.

BRIEF DESCRIPTION OF THE DRAWINGS

The above and other features of the invention will become more apparent by describing in detail exemplary embodiments thereof with reference to the attached drawings, in which.

DETAILED DESCRIPTION

Figure 1:
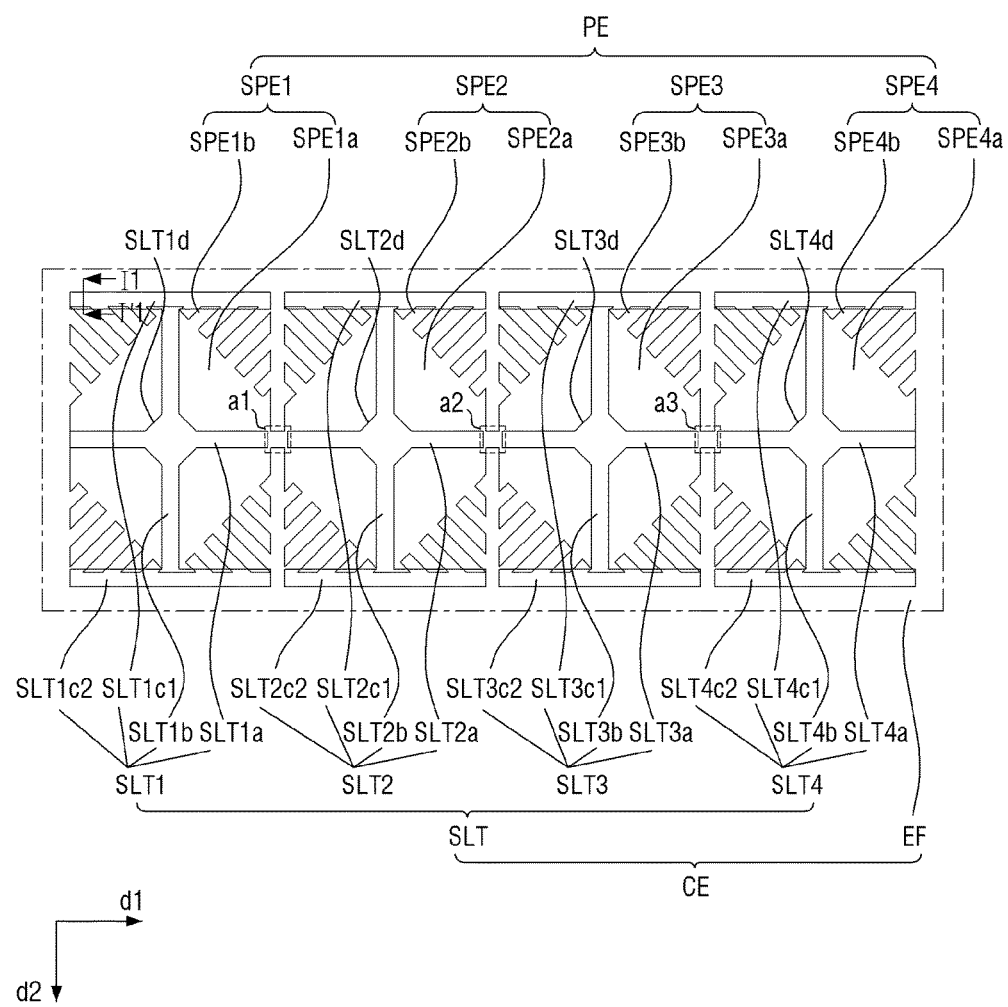
FIG. 1 is a plan view schematically showing a pixel electrode and a common electrode of a liquid crystal display device according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from X, Y, and Z" may be construed as X only, Y only, Z only, or any combination of two or more of X, Y, and Z, such as, for instance, XYZ, XYY, YZ, and ZZ.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. "Or" means "and/or." As used herein, the term "and/or" includes any and all combinations of one or more of the associated listed items. It will be further understood that the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the invention will be described in detail with reference to the accompanying drawings.

FIG. 1 is a plan view schematically showing a pixel electrode and a common electrode of a liquid crystal display device according to an embodiment of the invention.

Referring to FIG. 1, an embodiment of the liquid crystal display device includes a pixel electrode PE and a common electrode CE, which overlap each other when viewed from a thickness direction of the liquid crystal display device.

The pixel electrode PE may include at least two sub-pixel electrodes. Referring to FIG. 1, the pixel electrode PE may include first and second sub-pixel electrodes SPE1 and SPE2 which are spaced apart from each other. In an embodiment, the first and second sub-pixel electrodes SPE1 and SPE2 may be arranged in a first direction d1. In such an embodiment, the first and second sub-pixel electrodes SPE1 and SPE2 may be arranged on the same row. However, without being limited thereto, the first and second sub-pixel electrodes SPE1 and SPE2 may be arranged on the same column in a second direction d2 in an alternative embodiment. The first direction d1 may be perpendicular to the second direction d2. In FIG. 1, the first direction d1 is illustrated as a row direction, and the second direction d2 is illustrated as a column direction.

The first sub-pixel electrode SPE1 may include a first plate-shaped portion SPE1a and a plurality of first extending portions SPE1b. As shown in FIG. 1, the first plate-shaped portion SPE1a may have a rhombus-like plate shape in one embodiment. In such an embodiment, the plate refers to an intact (i.e., non-split) plate. The first plate-shaped portion SPE1a may overlap a first slit portion SLT1 of the common electrode CE to be described later. The plurality of first extending portions SPE1b may extend from the first plate-shaped portion SPE1a. The plurality of first extending portions SPE1b may extend from at least one of four edges of the first plate-shaped portion SPE1a having a rhombus-like shape in one embodiment.

The second sub-pixel electrode SPE2 may include a second plate-shaped portion SPE2a and a plurality of second extending portions SPE2b. As shown in FIG. 1, the second plate-shaped portion SPE2a may have a rhombus-like plate shape in one embodiment. The second plate-shaped portion SPE2a may overlap a second slit portion SLT2 of the common electrode CE to be described later. The plurality of second extending portions SPE2b may extend from the second plate-shaped portion SPE2a. The plurality of second extending portions SPE2b may be formed to extend from at least one of four edges of the second plate-shaped portion SPE2a having a rhombus-like shape in one embodiment.

The first sub-pixel electrode SPE1 is connected to the second sub-pixel electrode SPE2. Referring to FIG. 1, the first sub-pixel electrode SPE1 may be connected to the second sub-pixel electrode SPE2 in a first area a1. However, it is not limited thereto, and at least one of the plurality of first extending portions SPE1b may be connected to at least one of the plurality of second extending portions SPE2b in an alternative embodiment.

The pixel electrode PE may further include third and fourth sub-pixel electrodes SPE3 and SPE4. The third and fourth sub-pixel electrodes SPE3 and SPE4 may extend in the same direction as the extending direction of the first and second sub-pixel electrodes SPE1 and SPE2.

The third sub-pixel electrode SPE3 may include a third plate-shaped portion SPE3a and a plurality of third extending portions SPE3b extending from the third plate-shaped portion SPE3a. The fourth sub-pixel electrode SPE4 may include a fourth plate-shaped portion SPE4a and a plurality of fourth extending portions SPE4b extending from the fourth plate-shaped portion SPE4a. The third and fourth sub-pixel electrodes SPE3 and SPE4 may have the same shape as the first and second sub-pixel electrodes SPE1 and SPE2 in one embodiment.

The third plate-shaped portion SPE3a may overlap a third slit portion SLT3 to be described later, and the fourth plate-shaped portion SPE4a may overlap a fourth slit portion SLT4 to be described later. The third sub-pixel electrode SPE3 is connected to the fourth sub-pixel electrode SPE4. Referring to FIG. 1, the third sub-pixel electrode SPE3 may be connected to the fourth sub-pixel electrode SPE4 in a third area a3. In an embodiment, the second sub-pixel electrode SPE2 is connected to the third sub-pixel electrode SPE3. Referring to FIG. 1, the second sub-pixel electrode SPE2 may be connected to the third sub-pixel electrode SPE3 in a second area a2. In such an embodiment, all of the sub-pixel electrodes of the pixel electrode PE are connected to each other.

The common electrode CE may include an electric field forming portion EF and a slit portion SLT. The electric field forming portion EF may contain a transparent conductive material. In an embodiment, the electric field forming portion EF may include or be formed of a transparent conductive material such as indium tin oxide ("ITO") and indium zinc oxide ("IZO"), or reflective metal such as aluminum, silver, chromium or an alloy thereof in one embodiment. In such an embodiment, the electric field forming portion EF refers to a region overlapping the pixel electrode PE to generate an electric field with the pixel electrode PE to control the alignment of liquid crystal molecules.

The slit portion SLT is defined as a region where the electric field forming portion EF is not provided, e.g., an opening defined in the common electrode CE. The slit portion SLT may include the first and second slit portions SLT1 and SLT2.

The first slit portion SLT1 may include a first stem portion SLT1a extending in the first direction d1, a second stem portion SLT1b extending in the second direction d2, a first branch portion SLT1c1 located on one side in a longitudinal direction of the second stem portion SLT1b, and a second branch portion SLT1c2 located on the other side in the longitudinal direction of the second stem portion SLT1b. The first stem portion SLT1a crosses the second stem portion SLT1b. Accordingly, the first stem portion SLT1a and the second stem portion SLT1b may have a cross-like shape as a whole. In an embodiment, the longitudinal direction of a component as defined herein is an extending direction of the longest one among the edges of the component.

The first branch portion SLT1c1 may overlap the edge of the first sub-pixel electrode SPE1 located on one side in the longitudinal direction of the second stem portion SLT1b. The second branch portion SLT1C2 may overlap the edge of the first sub-pixel electrode SPE1 located on the other side in the longitudinal direction of the second stem portion SLT1b. In such an embodiment, the first stem portion SLT1a may extend in the same direction as the first branch portion SLT1c1 and the second branch portion SLT1c2, and may be disposed between the first branch portion SLT1c1 and the second branch portion SLT1c2.

The first stem portion SLT1a may have a linear shape surrounded by the electric field forming portion EF. In such an embodiment, the first branch portion SLT1c1 and the second branch portion SLT1c2 may be located on one side and the other side of the second stem portion SLT1b, respectively, and may have a linear shape surrounded by the electric field forming portion EF. In such an embodiment, the first stem portion SLT1a, the first branch portion SLT1c1 and the second branch portion SLT1c2 may have a linear shape in which the width of one end is equal to the width of the other end.

The first slit portion SLT1 may further include a first central portion SLT1d overlapping the first plate-shaped portion SPE1a. The first central portion SLT1d may be defined at a position at which the first stem portion SLT1a and the second stem portion SLT1b intersect each other. The first central portion SLT1d may have a rhombus-like shape in one embodiment.

In an embodiment, the electric field forming portion is disposed and the slit portion SLT is not defined on one side and the other side in the longitudinal direction of the first stem portion SLT1a. In such an embodiment, as shown in FIG. 1, the first slit portion SLT1 is defined in a way such that only the second stem portion SLT1b is arranged in the second direction d2, and all of the remaining portions thereof are arranged in the first direction d1. In such an embodiment, the first slit portion SLT1 may include the first stem portion SLT1a, the second stem portion SLT1b, the first branch portion SLT1c1, the second branch portion SLT1c2, and the first central portion SLT1d.

The second slit portion SLT2 may include a third stem portion SLT2a extending in the first direction d1, a fourth stem portion SLT2b extending in the second direction d2, a third branch portion SLT2c1 located on one side in a longitudinal direction of the fourth stem portion SLT2b, and a fourth branch portion SLT2c2 located on the other side in the longitudinal direction of the fourth stem portion SLT2b. The third stem portion SLT2a crosses the fourth stem portion SLT2b. In such an embodiment, the third stem portion SLT2a and the fourth stem portion SLT2b may have a cross-like shape as a whole.

The third branch portion SLT2c1 may overlap the edge of the second sub-pixel electrode SPE2 located on one side in the longitudinal direction of the fourth stem portion SLT2b. The fourth branch portion SLT2c2 may overlap the edge of the second sub-pixel electrode SPE2 located on the other side in the longitudinal direction of the fourth stem portion SLT2b. In such an embodiment, the third stem portion SLT2a may extend in the same direction as the third branch portion SLT2c1 and the fourth branch portion SLT2c2, and may be disposed between the third branch portion SLT2c1 and the fourth branch portion SLT2c2.

The third stem portion SLT2a may have a linear shape surrounded by the electric field forming portion EF. In such an embodiment, the third branch portion SLT2c1 and the fourth branch portion SLT2c2 may be located on one side and the other side of the fourth stem portion SLT2b, respectively, and may have a linear shape surrounded by the electric field forming portion EF. In such an embodiment, each of the third stem portion SLT2a, the third branch portion SLT2c1 and the fourth branch portion SLT2c2 may have a linear shape, e.g., a rectangular shape, in which the width of one end is equal to the width of the other end.

The second slit portion SLT2 may further include a second central portion SLT2d overlapping the second plate-shaped portion SPE2a. The second central portion SLT2d may be defined at a position at which the third stem portion SLT2a and the fourth stem portion SLT2b intersect each other. The second central portion SLT2d may have a rhombus-like shape in one embodiment.

In an embodiment, the electric field forming portion EF is disposed and the slit portion SLT is not defined on one side and the other side in the longitudinal direction of the third stem portion SLT2a. In such an embodiment, the second slit portion SLT2 is configured in a way such that only the fourth stem portion SLT2b is arranged in the second direction d2, and all of the remaining portions thereof are arranged in the first direction d1. In an embodiment, the second slit portion SLT2 may include the third stem portion SLT2a, the fourth stem portion SLT2b, the third branch portion SLT2c1, the fourth branch portion SLT2c2, and the second central portion SLT2d. In such an embodiment, the second slit portion SLT2 may have the same shape as the first slit portion SLT1, which will be described in greater detail with reference to FIG. 8.

The slit portion SLT may further include the third and fourth slit portions SLT3 and SLT4. The third slit portion SLT3 may overlap the third sub-pixel electrode SPE3. The fourth slit portion SLT4 may overlap the fourth sub-pixel electrode SPE4. In such an embodiment, the number of the slit portions SLT may correspond to the number of the sub-pixel electrodes.

The third slit portion SLT3 may include a fifth stem portion SLT3a extending in the first direction d1, a sixth stem portion SLT3b extending in the second direction d2, a fifth branch portion SLT3c1 located on one side in a longitudinal direction of the sixth stem portion SLT3b, and a sixth branch portion SLT3c2 located on the other side in the longitudinal direction of the sixth stem portion SLT3b.

The fifth branch portion SLT3c1 may overlap the edge of the third sub-pixel electrode SPE3 located on one side in the longitudinal direction of the sixth stem portion SLT3b. The sixth branch portion SLT3c2 may overlap the edge of the second sub-pixel electrode SPE2 located on the other side of the sixth stem portion SLT3b.

The third slit portion SLT3 may further include a third central portion SLT3d overlapping the third plate-shaped portion SPE3a. The third central portion SLT3d may be defined at a position at which the fifth stem portion SLT3a and the sixth stem portion SLT3b intersect each other. The third central portion SLT3d may have a rhombus-like shape in one embodiment.

The fourth slit portion SLT4 may include a seventh stem portion SLT4a extending in the first direction d1, an eighth stem portion SLT4b extending in the second direction d2, a seventh branch portion SLT4c1 located on one side in a longitudinal direction of the eighth stem portion SLT4b, and an eighth branch portion SLT4c2 located on the other side in the longitudinal direction of the eighth stem portion SLT4b.

The seventh branch portion SLT4c1 may overlap the edge of the fourth sub-pixel electrode SPE4 located on one side of the eighth stem portion SLT4b. The eighth branch portion SLT4c2 may overlap the edge of the second sub-pixel electrode SPE2 located on the other side of the eighth stem portion SLT4b.

The fourth slit portion SLT4 may further include a fourth central portion SLT4d overlapping the fourth plate-shaped portion SPE4a. The fourth central portion SLT4d may be formed at a position at which the seventh stem portion SLT4a and the eighth stem portion SLT4b intersect each other. The fourth central portion SLT4d may have a rhombus-like shape in one embodiment.

As shown in FIG. 1, the first to fourth slit portions SLT1 to SLT4 may have the same shape as each other in one embodiment.

Figure 2:
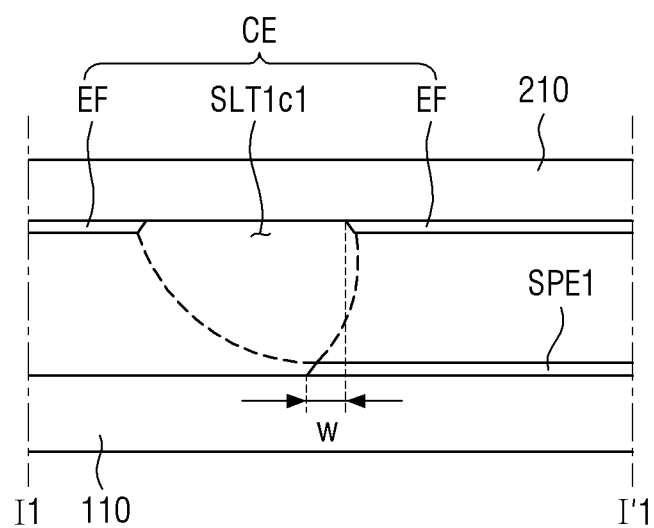
FIG. 2 is a cross-sectional view taken along line I1-I1' shown in FIG. 1.

FIG. 2 is a cross-sectional view taken along line I1-I1' shown in FIG. 1. However, for simplicity of description, in FIG. 2, the pixel electrode PE and the common electrode CE are mainly illustrated and the other configuration of the liquid crystal display device is omitted. The following description will focus on the first sub-pixel electrode SPE1 and the first slit portion SLT1 overlapping the first sub-pixel electrode SPE1. Further, an area of the first sub-pixel electrode SPE1 overlapping the first branch portion SLT1c1 will be referred to as one-side edge, and an area of the first sub-pixel electrode SPE1 overlapping the second branch portion SLT1c2 will be referred to as other-side edge.

Referring to FIGS. 1 and 2, the pixel electrode PE may be disposed on a first substrate (or a lower substrate) 110, and the common electrode CE may be disposed on a second substrate (or an upper substrate) 210 facing the first substrate 110.

The pixel electrode PE may include or be formed of a transparent conductive material such as ITO and IZO, or reflective metal such as aluminum, silver, chromium or an alloy thereof in one embodiment. The pixel electrode PE may overlap the common electrode CE. In an embodiment, the pixel electrode PE may overlap the electric field forming portion EF of the common electrode CE to generate an electric field with the electric field forming portion EF.

The first slit portion SLT1 of the common electrode CE may overlap the first sub-pixel electrode SPE1, when viewed from a thickness direction of the liquid crystal display device. In such an embodiment, the first branch portion SLT1c1 of the first slit portion SLT1 may overlap the one-side edge of the first sub-pixel electrode SPE1.

Accordingly, in such an embodiment, the intensity of the electric field (fringe field) generated between the one-side edge of the first sub-pixel electrode SPE1 and the common electrode CE may be weakened or decreased. In an embodiment, the electric field (fringe field) generated between the one-side edge of the first sub-pixel electrode SPE1 and the common electrode CE may be weakened by the first slit portion SLT1 further including the first branch portion SLT1c1. In such an embodiment, lateral visibility is improved by enhancing the alignment of liquid crystal molecules at the one-side edge of the first sub-pixel electrode SPE1.

In an embodiment, the other-side edge of the first sub-pixel electrode SPE1 may overlap the second branch portion SLT1c2. Accordingly, the intensity of the electric field generated between the other-side edge of the first sub-pixel electrode SPE1 and the common electrode CE may be weakened. In such an embodiment, lateral visibility is improved by enhancing the alignment of liquid crystal molecules at the other-side edge of the first sub-pixel electrode SPE1.

Figure 3A:
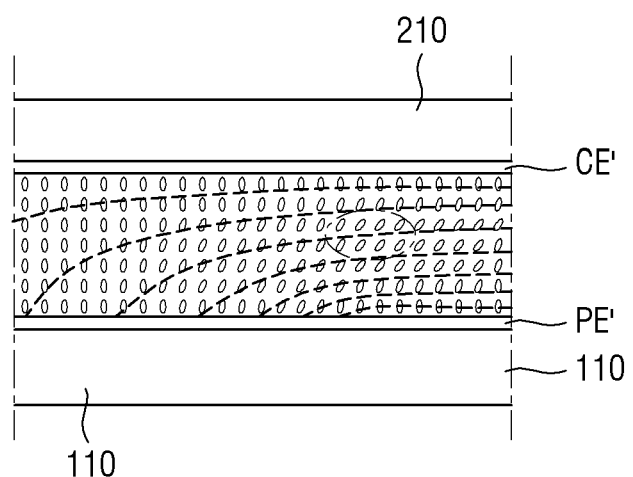
FIG. 3A is a cross-section view illustrating an electric field generated in a liquid crystal display device according to a comparative example.
Figure 3B:
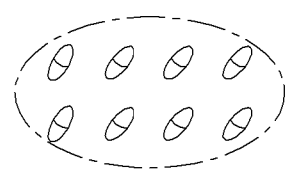
FIG. 3B is an enlarged view of the encircled portion of FIG. 3A.
Figure 3C:
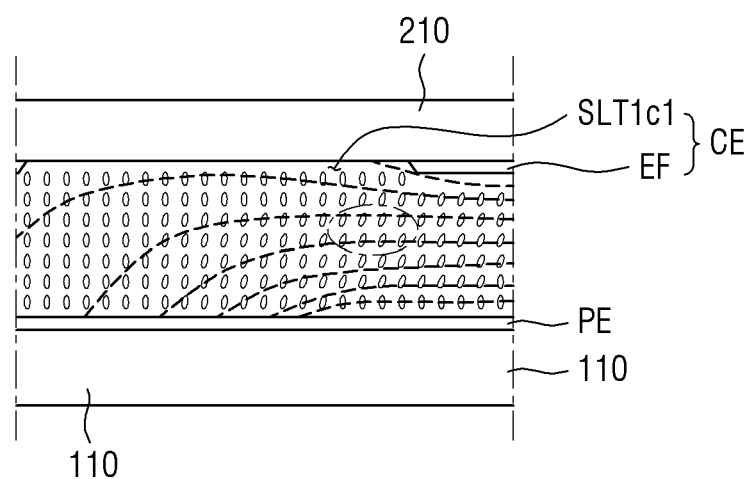
FIG. 3C is a cross-section view illustrating an electric field generated in a liquid crystal display device according to an embodiment of the invention.
Figure 3D:
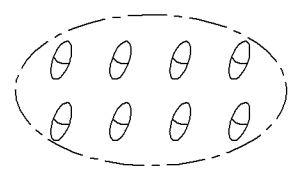
FIG. 3D is an enlarged view of the encircled portion of FIG. 3C.

FIG. 3A is a cross-section view illustrating an electric field generated in a liquid crystal display device according to a comparative example, FIG. 3B is an enlarged view of the encircled portion of FIG. 3A, FIG. 3C is a cross-section view illustrating an electric field generated in a liquid display device according to an embodiment of the invention, and FIG. 3D is an enlarged view of the encircled portion of FIG. 3C. FIGS. 3A and 3B illustrates an electric field generated in a conventional liquid crystal display device according to a comparative example, and FIGS. 3C and 3D illustrates an electric field generated in the liquid crystal display device according to an embodiment of the invention.

Referring to FIGS. 3A and 3B, in the comparative example, a plurality of liquid crystal molecules 31' may be aligned by the electric field generated between a common electrode CE' and a pixel electrode PE'. Particularly, referring between a common electrode CE' and a pixel electrode PE', and as shown in FIG. 3B, the plurality of liquid crystal molecules 31' may be aligned substantially in a horizontal direction relative to the lower substrate 110.

In an embodiment, referring to FIGS. 3C and 3D, an electric field may be generated between the common electrode CE and the pixel electrode PE, but the intensity of the electric field may be weaker than that of FIGS. 3A and 3B because the common electrode CE includes the first branch portion SLT1c1, i.e., an opening region where a transparent conductive material is not provided. Particularly, referring to FIG. 3D, a plurality of liquid crystal molecules 31 may be aligned substantially in a vertical direction relative to the lower substrate 110.

In an embodiment, referring to FIGS. 3C and 3D, the first sub-pixel electrode SPE1 may overlap the first branch portion SLT1c1. In such an embodiment a width w at which two components overlap each other may be equal to or less than about 2 micrometers (μm) in one embodiment.

In the liquid crystal display device according to an embodiment of the invention, the intensity of the electric field generated at the edge of the pixel electrode may be weak compared to the liquid crystal display device according to the comparative example. Accordingly, the alignment of liquid crystal molecules may be enhanced at the edge of the pixel electrode, thereby improving lateral visibility.

In an exemplary embodiment of the invention shown in FIG. 3C, as shown in the table below, the transmittance increases by about 3.1% compared to the comparative example shown in FIG. 3A. In an embodiment of the invention, as shown in the Table below, a lateral image quality index (gamma distortion index ("GDI")) is also improved (e.g., reduced by about 0.03) due to a decrease of the liquid crystal molecules 31 aligned in the horizontal direction on the first substrate 110.

TABLE

| | Transmittance (%) | Lateral image quality index (GDI) |
|---|---|---|
| Case (a) (comparative example) | 100% | 0.40 |
| Case (b) (invention) | 103.1% | 0.36 |

Figure 4:
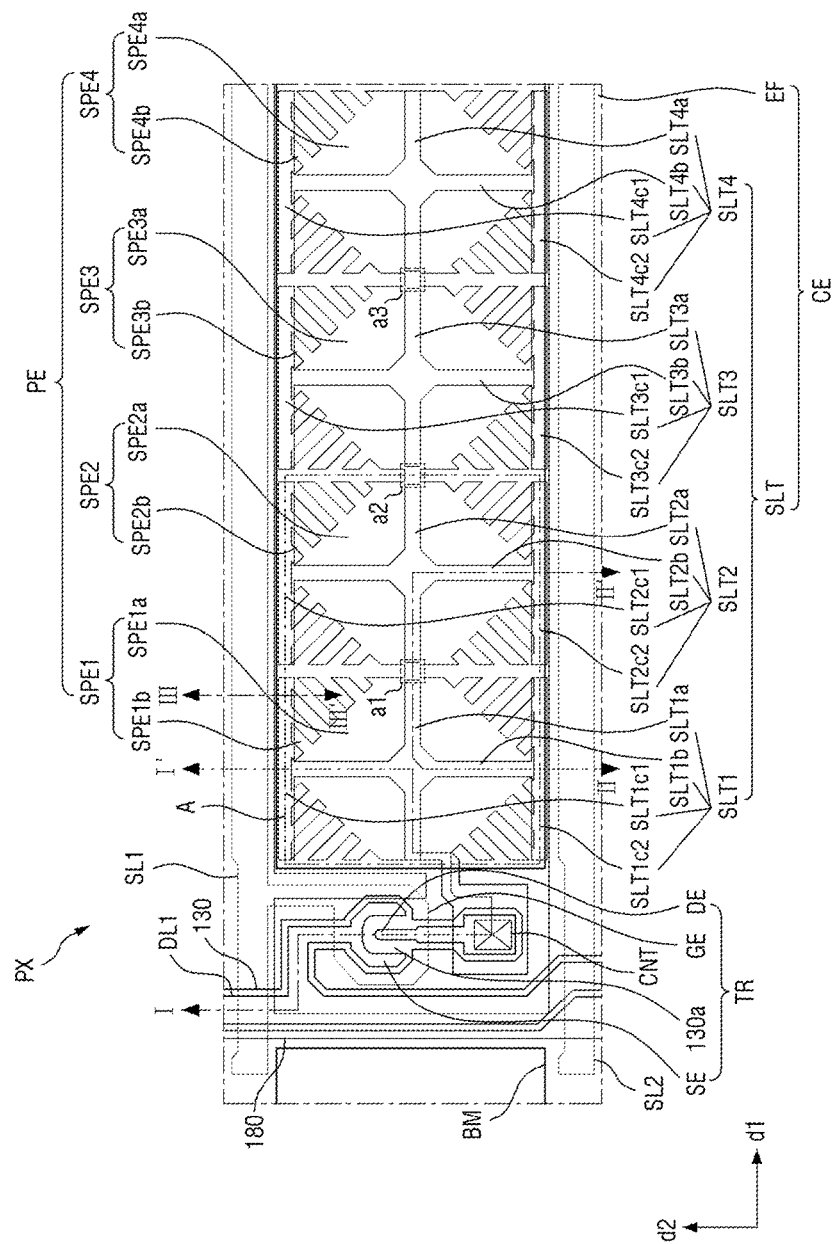
FIG. 4 is a plan view illustrating a pixel unit of a liquid crystal display device according to an embodiment of the invention.
Figure 5:
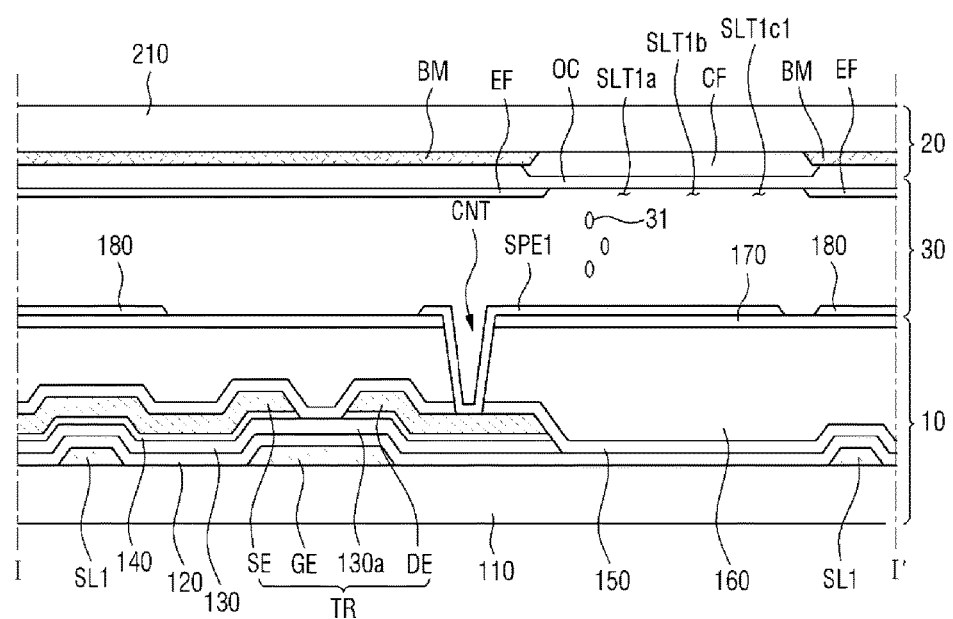
FIG. 5 is a cross-sectional view taken along line I-I' shown in FIG. 4.
Figure 6:
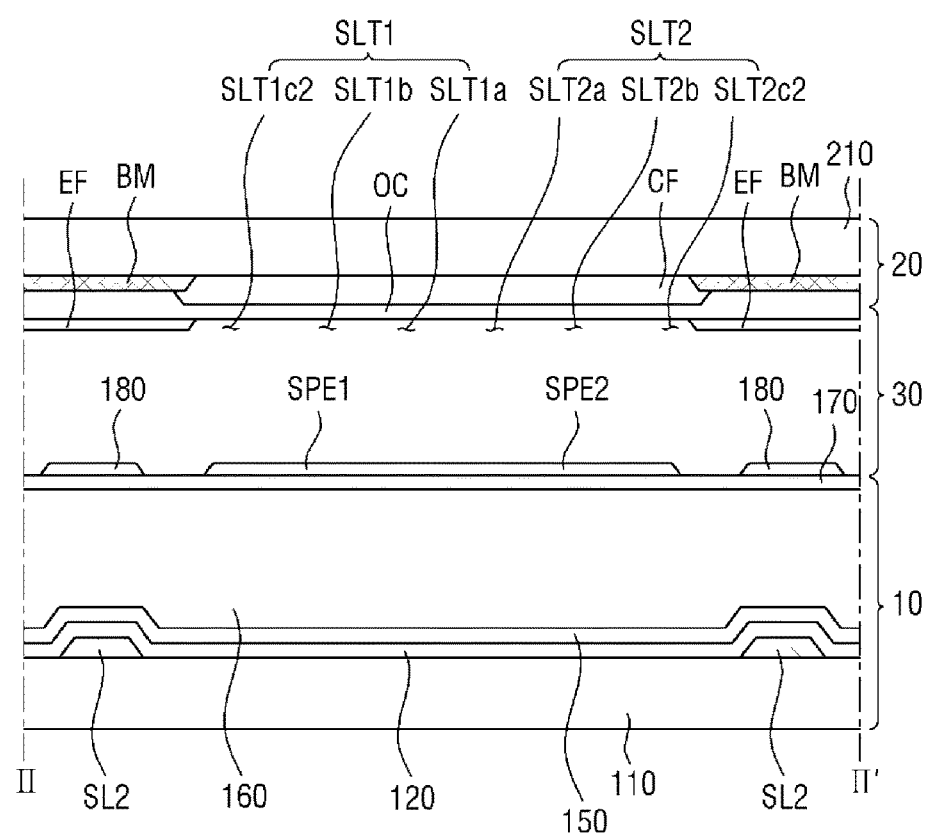
FIG. 6 is a cross-sectional view taken along line II-II' shown in FIG. 4.
Figure 7:
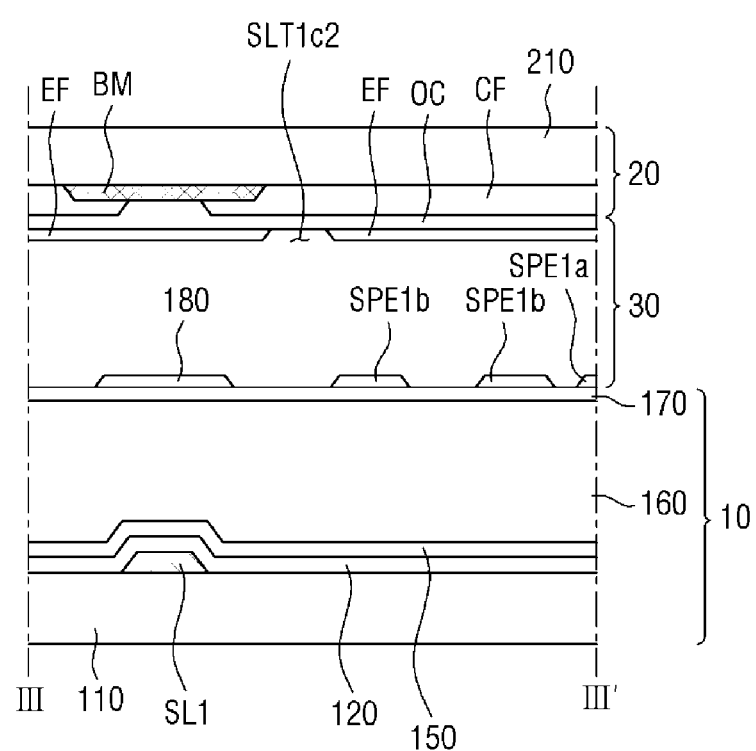
FIG. 7 is a cross-sectional view taken along line III-III' shown in FIG. 4.

FIG. 4 is a plan view illustrating a pixel unit of a liquid crystal display device according to an embodiment of the invention. FIG. 5 is a cross-sectional view taken along line I-I' shown in FIG. 4. FIG. 6 is a cross-sectional view taken along line II-II' shown in FIG. 4. FIG. 7 is a cross-sectional view taken along line III-III' shown in FIG. 4. In an embodiment shown in FIGS. 4 to 7, the common electrode CE and the pixel electrode PE are substantially the same as those described above with reference to FIGS. 1 to 3, and any repetitive detailed description thereof will hereinafter be simplified or omitted.

Referring to FIGS. 4 to 7, in an embodiment of a liquid crystal display device, a lower display panel 10 may be bonded to an upper display panel 20 through sealing. The lower display panel 10 and the upper display panel 20 may be disposed to face each other. A liquid crystal layer 30 including a plurality of liquid crystal molecules 31 may be interposed between the lower display panel 10 and the upper display panel 20.

First, the lower display panel 10 will be described in detail.

The lower display panel 10 may include the lower substrate 110, and further include a first scan line SL1 and a second scan line SL2 disposed on the lower substrate 110. The lower substrate 110 may be a transparent glass substrate, a plastic substrate or the like in one embodiment.

The first and second scan lines SL1 and SL2 may extend in the first direction dl on the lower substrate 110. However, without being limited thereto, the extending direction of the first and second scan lines SL1 and SL2 may be variously modified based on the arrangement direction of the first to fourth sub-pixel electrodes SPE1 to SPE4.

A gate electrode GE is disposed on the lower substrate 110 and connected to the first scan line SL1. The gate electrode GE may be disposed on or in a same layer as the first and second scan lines SL1 and SL2.

The gate electrode GE, the first scan line SL1 and the second scan line SL2 may have a single-layer structure including at least one conductive metal selected from aluminum (Al), copper (Cu), molybdenum (Mo), chromium (Cr), titanium (Ti), tungsten (W), moly-tungsten (MoW), moly-titanium (MoTi), and copper/moly-titanium (Cu/MoTi), or a double or triple-layer structure including at least two of the conductive metals listed above.

A gate insulating film 120 may be disposed on the gate electrode GE, the first scan line SL1 and the second scan line SL2. The gate insulating film 120 may include or be formed of silicon nitride (SiNx) or silicon oxide (SiOx) in one embodiment. The gate insulating film 120 may have a multilayer structure including at least two insulating layers having different physical properties from each other.

A semiconductor layer 130 may be disposed on the gate insulating film 120. The semiconductor layer 130 may include a semiconductor pattern 130a forming a channel region of a switching element TR. In one embodiment, for example, the semiconductor layer 130 may include an oxide semiconductor. The semiconductor layer 130 may include or be formed of at least one oxide semiconductor selected from indium gallium zinc oxide ("IGZO"), ZnO, $ZnO_2$, CdO, SrO, $SrO_2$, CaO, $CaO_2$, MgO, $MgO_2$, InO, $In_2O_2$, GaO, $Ga_2O$, $Ga_2O_3$, SnO, $SnO_2$, GeO, $GeO_2$, PbO, $Pb_2O_3$, $Pb_3O_4$, TiO, $TiO_2$, $Ti_2O_3$, and $Ti_3O_5$. In an alternative embodiment, the semiconductor layer 130 may include or be formed of amorphous silicon, polycrystalline silicon or the like.

An ohmic contact layer 140 may be disposed on the semiconductor layer 130. The ohmic contact layer 140 may include or be made of silicide or n+ hydrogenated amorphous silicon doped with n type impurities such as phosphorus in high concentration. In an embodiment, where the semiconductor layer 130 includes or is made of an oxide semiconductor, the ohmic contact layer 140 may be omitted.

A first data line DL1, a source electrode SE and a drain electrode DE may be disposed on the gate insulating film 120 and the ohmic contact layer 140. The first data line DL1 may be disposed on the lower substrate 110 to extend in the second direction d2. However, without being limited thereto, the extending direction of the first data line DL1 may be variously modified based on the arrangement direction of the first and second sub-pixel electrodes SPE1 and SPE2.

The first data line DL1, the source electrode SE and the drain electrode DE may have a single-layer structure including or made of at least one conductive metal selected from aluminum (Al), copper (Cu), molybdenum (Mo), chromium (Cr), titanium (Ti), tungsten (W), moly-tungsten (MoW), moly-titanium (MoTi), and copper/moly-titanium (Cu/MoTi), or a double or triple-layer structure including or made of at least two of the conductive metals listed above. However, without being limited thereto, the first data line DL1, the source electrode SE and the drain electrode DE may be made of various metals or conductors.

The first data line DL1, the source electrode SE and the drain electrode DE may be provided or formed at the same time with the semiconductor layer 130 and the ohmic contact layer 140 through a same mask process in one embodiment. In such an embodiment, the first data line DL1, the source electrode SE and the drain electrode DE may have substantially the same shape as the semiconductor layer 130 except for the semiconductor pattern 130a.

The source electrode SE and the drain electrode DE constitute or collectively define the switching element TR together with the semiconductor pattern 130a and the gate electrode GE. The source electrode SE of the switching element TR may be connected to the first data line DL1. The drain electrode DE of the switching element TR may be connected to the first sub-pixel electrode SPE1 through a contact hole CNT. The source electrode SE of the switching element TR is spaced apart by a predetermined distance from the drain electrode DE of the switching element TR on the same layer. The channel region of the switching element TR may be formed between the source electrode SE and the drain electrode DE in response to a scan signal provided through the gate electrode GE.

A first passivation film 150 may be disposed on the first data line DL1, the source electrode SE and the drain electrode DE. The first passivation film 150 may include or be formed of an inorganic insulating material such as silicon nitride and silicon oxide in one embodiment. The first passivation film 150 may effectively prevent a pigment of an organic insulating film 160, which will be described later, from flowing into the semiconductor pattern 130a.

The organic insulating film 160 may be disposed on the first passivation film 150. The organic insulating film 160 has high planarization characteristics, and may include an organic material having photosensitivity. Alternatively, the organic insulating film 160 may be omitted.

A second passivation film 170 may be disposed on the organic insulating film 160. The second passivation film 170 may include or be formed of an inorganic insulating material such as silicon nitride and silicon oxide in one embodiment.

The pixel electrode PE may be disposed on the second passivation film 170. The pixel electrode PE may include at least two sub-pixel electrodes. FIGS. 4 to 7 show one exemplary embodiment where the pixel electrode PE includes the first to fourth sub-pixel electrodes SPE1 to SPE4.

The first sub-pixel electrode SPE1 may be connected to the second sub-pixel electrode SPE2 in the first area a1. The second sub-pixel electrode SPE2 may be connected to the third sub-pixel electrode SPE3 in the second area a2, and the third sub-pixel electrode SPE3 may be connected to the fourth sub-pixel electrode SPE4 in the third area a3. Accordingly, the first to fourth sub-pixel electrodes SPE1 to SPE4 may be connected to each other. However, the connection positions are not limited to the first to third areas a1 to a3 as shown in FIG. 4.

The first to fourth sub-pixel electrodes SPE1 to SPE4 overlap the common electrode CE, e.g., the electric field forming portion EF of the common electrode CE. The first to fourth sub-pixel electrodes SPE1 to SPE4 overlap the common electrode CE to generate an electric field to have the plurality of liquid crystal molecules 31 to be rotated in a particular direction. In the liquid crystal display device according to an embodiment of the invention, the first to fourth sub-pixel electrodes SPE1 to SPE4 may have the same shape as each other. The shape of the common electrode CE and the pixel electrode PE will be described later in greater detail with reference to FIGS. 8 and 9.

The first sub-pixel electrode SPE1 may be connected to the drain electrode DE of the switching element TR through a portion thereof exposed by the contact hole CNT. In such an embodiment, the first sub-pixel electrode SPE1 is connected to all of the second to fourth sub-pixel electrodes SPE2 to SPE4 as described above, such that the pixel electrode PE may be provided with a data signal from the first data line DL1 through the switching element TR. In an embodiment, the pixel electrode PE may include or be formed of a transparent conductive material such as ITO and IZO, or reflective metal such as aluminum, silver, chromium or an alloy thereof.

A shielding electrode 180 may be disposed on the same layer as the pixel electrode PE. The shielding electrode 180 may include or be formed of a transparent conductive material such as ITO and IZO, or reflective metal such as aluminum, silver, chromium or an alloy thereof. The shielding electrode 180 may be disposed to overlap the first scan line SL1, the second scan line SL2 and the first data line DL1 in the thickness direction of the lower substrate 110 in one embodiment. Accordingly, the shielding electrode 180 may effectively prevent light leakage due to coupling between the first and second scan lines SL1 and SL2 and the pixel electrode PE.

Although not shown in the drawings, a first alignment film may be disposed on the pixel electrode PE. The first alignment film may include or be formed of polyimide or the like.

Next, the upper display panel 20 will be described in detail.

The upper display panel 20 may include the upper substrate 210 disposed to face the lower substrate 110. The upper substrate 210 may include or be formed of transparent glass or plastic or the like, and may be formed of the same material as the lower substrate 110 in one embodiment.

A black matrix BM may be disposed on the upper substrate 210 to block light from being transmitted through a region other than a pixel region. The black matrix BM may include be formed of a metal material including chromium or an organic material in one embodiment.

A color filter CF may be disposed on the upper substrate 210 and the black matrix BM. The color filter CF may display one of primary colors, e.g., three primary colors such as red, green and blue, but not being limited thereto. The color filter CF may include or be formed of a material for displaying a different color for each of adjacent pixels.

An overcoat layer OC may be disposed on the color filter CF. The overcoat layer OC may include or be formed of an insulating material and may be omitted in some cases.

The common electrode CE may be disposed on the overcoat layer OC. The common electrode CE may be disposed to overlap the pixel electrode PE. The common electrode CE may include the electric field forming portion EF and the slit portion SLT.

The electric field forming portion EF may include or be formed of a transparent conductive material such as ITO and IZO, or reflective metal such as aluminum, silver, chromium or an alloy thereof. In an embodiment, the slit portion SLT refers to an opening portion in which the electric field forming portion EF is removed. The slit portion SLT may include the first to fourth slit portions SLT1 to SLT4 overlapping the first to fourth sub-pixel electrodes SPE1 to SPE4, respectively. In the liquid crystal display device according to an embodiment of the invention, the first to fourth slit portions SLT1 to SLT4 may have the same shape as each other. The shape of the slit portion SLT will be described later with reference to FIGS. 8 and 9.

Although not shown in the drawings, a second alignment film (not illustrated) may be disposed on the common electrode CE. The second alignment film may be formed of polyimide or the like.

Figure 8:
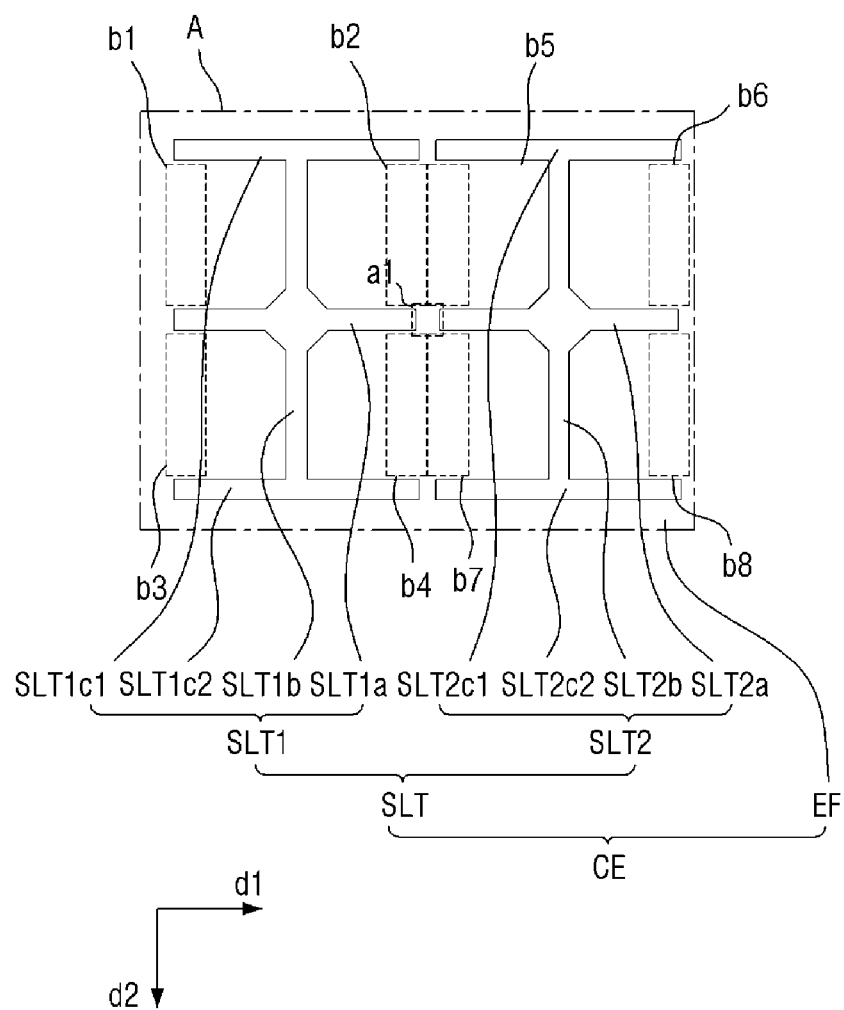
FIG. 8 is a view specifically showing the first and second slit portions in a region A of FIG. 4.
Figure 9:
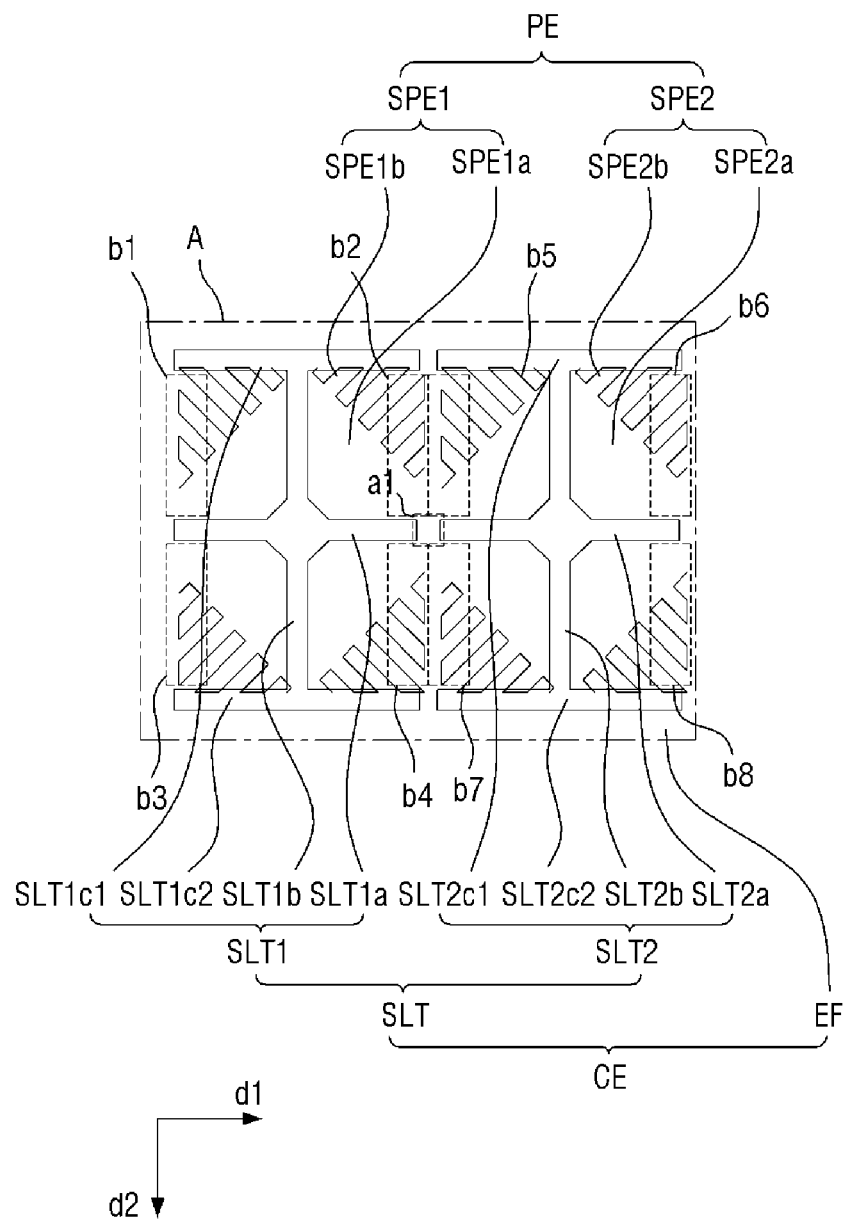
FIG. 9 is a view specifically showing the first slit portion, the second slit portion, the first sub-pixel electrode and the second sub-pixel electrode in the region A of FIG. 4.

FIG. 8 is a view specifically showing the first and second slit portions in a region A of FIG. 4. FIG. 9 is a view specifically showing the first slit portion, the first sub-pixel electrode and the second sub-pixel electrode in the region A of FIG. 4. In FIGS. 8 and 9, the first and second sub-pixel electrodes SPE1 and SPE2 are illustrated to describe the pixel electrode PE, and the first and second slit portions SLT1 and SLT2 are illustrated to describe the common electrode CE.

Referring to FIG. 8, the first slit portion SLT1 may include the first stem portion SLT1$a$ extending in the first direction d1, the second stem portion SLT1$b$ extending in the second direction d2, the first branch portion SLT1$c$1 located on one side in the longitudinal direction of the second stem portion SLT1$b$, and the second branch portion SLT1$c$2 located on the other side in the longitudinal direction of the second stem portion SLT1$b$. The first stem portion SLT1$a$ crosses the second stem portion SLT1$b$. The first stem portion SLT1$a$ may pass through the center of the second stem portion SLT1$b$ in one embodiment. Accordingly, the first stem portion SLT1$a$ and the second stem portion SLT1$b$ may have a cross-like shape as a whole.

The first branch portion SLT1$c$1 may overlap the edge of the first sub-pixel electrode SPE1 located on one side of the second stem portion SLT1$b$. The second branch portion SLT1C2 may overlap the edge of the first sub-pixel electrode SPE1 located on the other side of the second stem portion SLT1$b$. The first stem portion SLT1$a$ may have a linear shape surrounded by the electric field forming portion EF. In such an embodiment, the first branch portion SLT1$c$1 and the second branch portion SLT1$c$2 may be located on one side and the other side of the second stem portion SLT1$b$, respectively, and may have a linear shape surrounded by the electric field forming portion EF. The first slit portion SLT1 may further include the first central portion SLT1$d$ overlapping the first plate-shaped portion SPE1$a$. The first central portion SLT1$d$ may be formed at a position at which the first stem portion SLT1$a$ and the second stem portion SLT1$b$ intersect each other.

In such an embodiment, the electric field forming portion is disposed and the slit portion SLT is not defined on one side and the other side in the longitudinal direction of the first stem portion SLT1$a$. In such an embodiment, the slit portion SLT is not formed in areas b1 to b4 of the first slit portion and areas b5 to b8 of the second slit portion. In such an embodiment, the electric field forming portion EF is defined in the areas b1 to b8. Consequently, the first slit portion SLT1 is configured in way such that only the second stem portion SLT1$b$ is arranged in the second direction d2, and all of the remaining portions of the first slit portion SLT1 are arranged in the first direction d1. In such an embodiment, the second slit portion SLT2 is configured in way such that only the fourth stem portion SLT2$b$ is arranged in the second direction d2, and all of the remaining portions of the second slit portion SLT2 are arranged in the first direction d1.

Referring to FIG. 9, the first sub-pixel electrode SPE1 may include the first plate-shaped portion SPE1$a$ and the plurality of first extending portions SPE1$b$. The first plate-shaped portion SPE1$a$ may have a rhombus-like plate shape in one embodiment. The first plate-shaped portion SPE1$a$ may overlap the first slit portion SLT1 of the common electrode CE to be described later. The plurality of first extending portions SPE1$b$ may extend from the first plate-shaped portion SPE1$a$. The plurality of first extending portions SPE1$b$ may be formed to extend from at least one of four edges of the first plate-shaped portion SPE1$a$ having a rhombus-like shape in one embodiment.

The second sub-pixel electrode SPE2 may include a second plate-shaped portion SPE2$a$ and a plurality of second extending portions SPE2$b$. The second plate-shaped portion SPE2$a$ may have a rhombus-like plate shape in one embodiment. The second plate-shaped portion SPE2$a$ may overlap the second slit portion SLT2 of the common electrode CE to be described later. The plurality of second extending portions SPE2b may extend from the second plate-shaped portion SPE2a. The plurality of second extending portions SPE2b may be formed to extend from at least one of four edges of the second plate-shaped portion SPE2a having a rhombus-like shape in one embodiment.

In such an embodiment, the intensity of the electric field generated between the common electrode CE and each of the edges of the first sub-pixel electrode SPE1 located on one side and the other side in the longitudinal direction of the second stem portion SLT1b may be weakened by the first and second branch portions SLT1c1 and SLT1c2 located on one side and the other side in the longitudinal direction of the second stem portion SLT1b.

In such an embodiment, the intensity of the electric field generated between the common electrode CE and each of the edges of the second sub-pixel electrode SPE2 located on one side and the other side in the longitudinal direction of the fourth stem portion SLT2b may be weakened by the third and fourth branch portions SLT2c1 and SLT2c2 located on one side and the other side in the longitudinal direction of the fourth stem portion SLT2b.

Accordingly, in an embodiment of the invention, lateral visibility is improved by enhancing the alignment of liquid crystal molecules on one side and the other side in the longitudinal direction of the first sub-pixel electrode SPE1 and on one side and the other side of the second sub-pixel electrode SPE2.

FIGS. 10 to 14 are plan views illustrating a structure of a common electrode of a liquid crystal display device according to alternative embodiments of the invention. Hereinafter, for convenience of description, exemplary embodiments, where the pixel electrode PE includes the first to fourth sub-pixel electrodes SPE1 to SPE4 adjacent to each other in the first direction d1 and the slit portion SLT of the common electrode CE includes the first to fourth slit portions SLT1 to SLT4 will be described in detail. The same or like elements shown in FIGS. 10 to 14 have been labeled with the same reference characters as used above to describe the embodiments shown in FIGS. 1 to 9, and any repetitive detailed description thereof will hereinafter be omitted or simplified.

Figure 10:
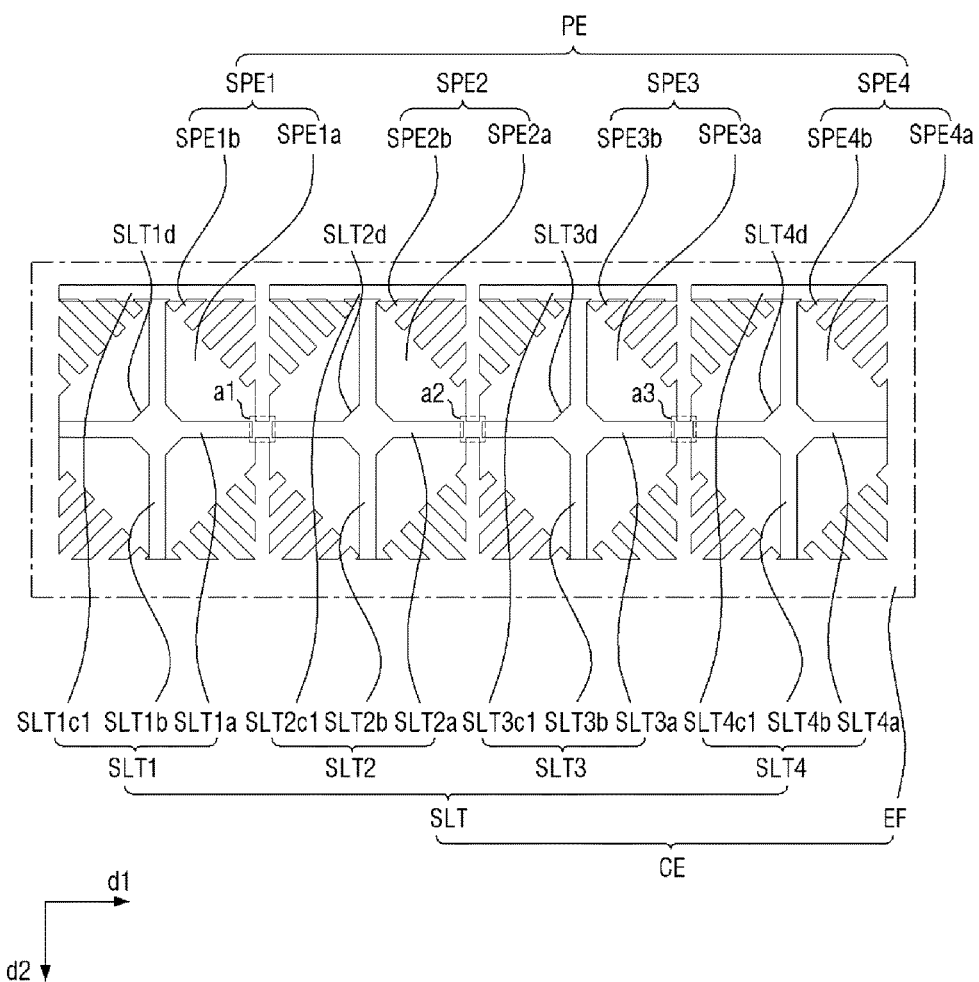
FIGS. 10 to 14 are plan views illustrating a structure of a common electrode of a liquid crystal display device according to alternative embodiments of the invention.

Referring to FIG. 10, in an embodiment, the first slit portion SLT1 may include the first stem portion SLT1a extending in the first direction d1, the second stem portion SLT1b extending in the second direction d2, and the first branch portion SLT1c1 located on one side in the longitudinal direction of the second stem portion SLT1b.

The first branch portion SLT1c1 may overlap the edge of the first sub-pixel electrode SPE1 located on one side of the second stem portion SLT1b. In such an embodiment, the electric field forming portion EF may overlap the edge of the first sub-pixel electrode SPE1 located on the other side in the longitudinal direction of the second stem portion SLT1b.

In such an embodiment, the second to fourth slit portions SLT2 to SLT4 may have the same shape as the first slit portion SLT1.

Figure 11:
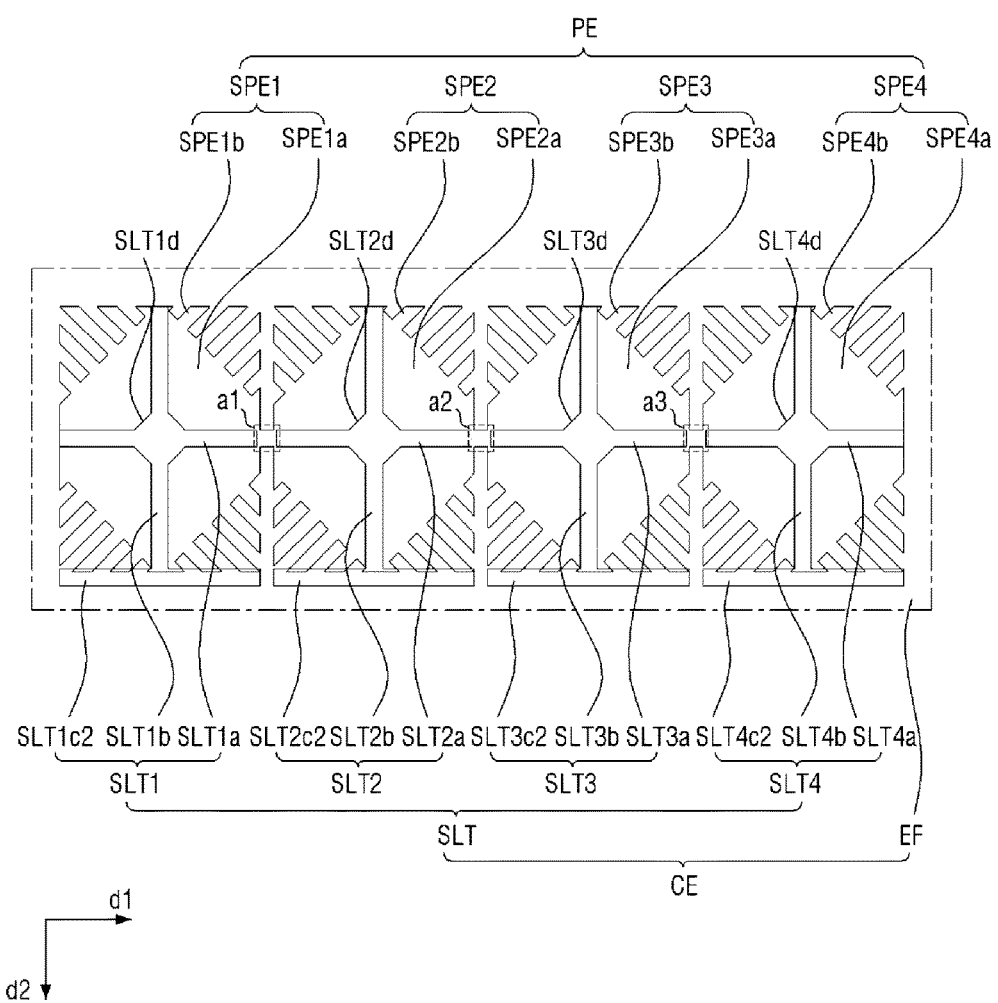

Referring to FIG. 11, in an alternative embodiment, the first slit portion SLT1 may include the first stem portion SLT1a extending in the first direction d1, the second stem portion SLT1b extending in the second direction d2, and the second branch portion SLT1c2 located on the other side in the longitudinal direction of the second stem portion SLT1b. In such an embodiment, the other side in the longitudinal direction of the second stem portion SLT1b refers to a portion opposite to one side in the longitudinal direction of the second stem portion SLT1b shown in FIG. 10.

The second branch portion SLT1c2 may overlap the edge of the first sub-pixel electrode SPE1 located on the other side in the longitudinal direction of the second stem portion SLT1b. In such an embodiment, the edge of the first sub-pixel electrode SPE1 located on the other side in the longitudinal direction of the second stem portion SLT1b may overlap the electric field forming portion EF.

Accordingly, in alternative embodiment of the liquid crystal display, the branch portion SLT1c1 or SLT1c2 overlapping the edge of the first sub-pixel electrode SPE1 may be defined on one of the one side and the other side of the second stem portion SLT1b, and no branch portion is defined the other of the one side and the other side of the second stem portion SLT1b.

Figure 12:
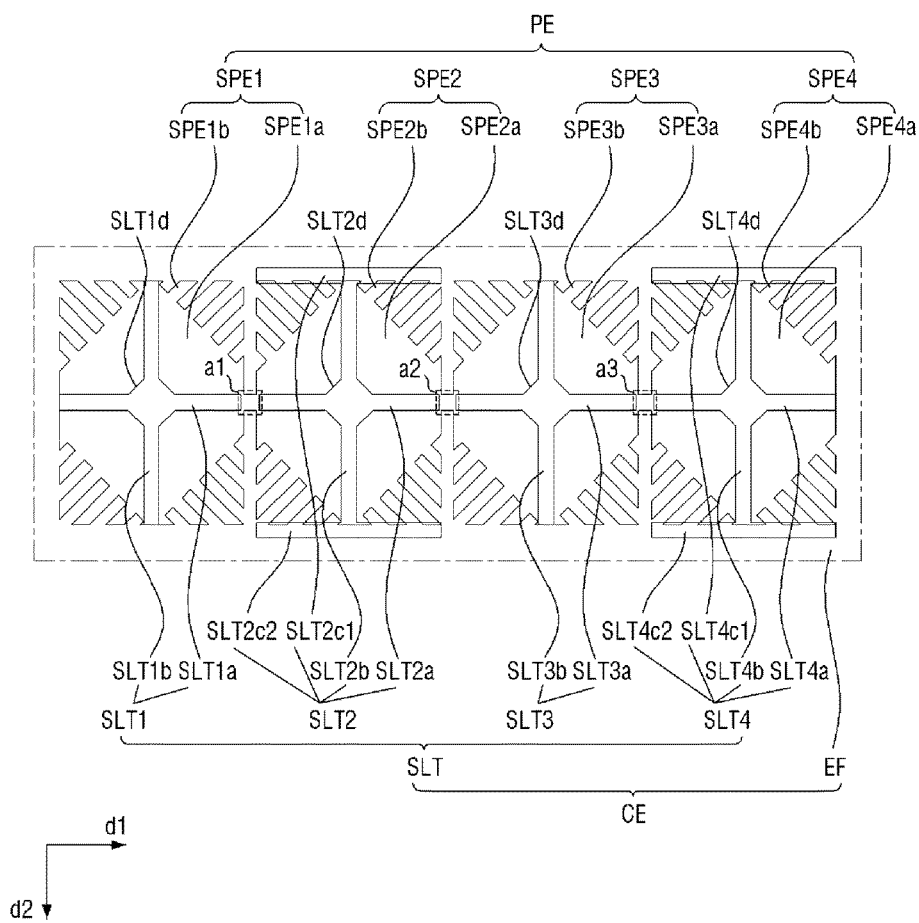

Referring to FIG. 12, in another alternative embodiment, the first slit portion SLT1 may include the first stem portion SLT1a extending in the first direction d1, and the second stem portion SLT1b extending in the second direction d2. In such an embodiment, the second stem portion SLT1b may cross the first stem portion SLT1a, and may pass through the center of the first stem portion SLT1a in one embodiment. In such an embodiment, the first slit portion SLT1 may have a cross-like shape as a whole.

In such an embodiment, the second slit portion SLT2 may include the third stem portion SLT2a extending in the first direction d1, the fourth stem portion SLT2b extending in the second direction d2, the third branch portion SLT2c1 located on one side in a longitudinal direction of the fourth stem portion SLT2b, and the fourth branch portion SLT2c2 located on the other side in the longitudinal direction of the fourth stem portion SLT2b.

In such an embodiment, the third slit portion SLT3 may have the same shape as the first slit portion SLT1, and the fourth slit portion SLT4 may have the same shape as the second slit portion SLT2. In such an embodiment, the first and third slit portions SLT1 and SLT3 may not include branch portions, and the second and fourth slit portions SLT2 and SLT4 may include branch portions.

Figure 13:
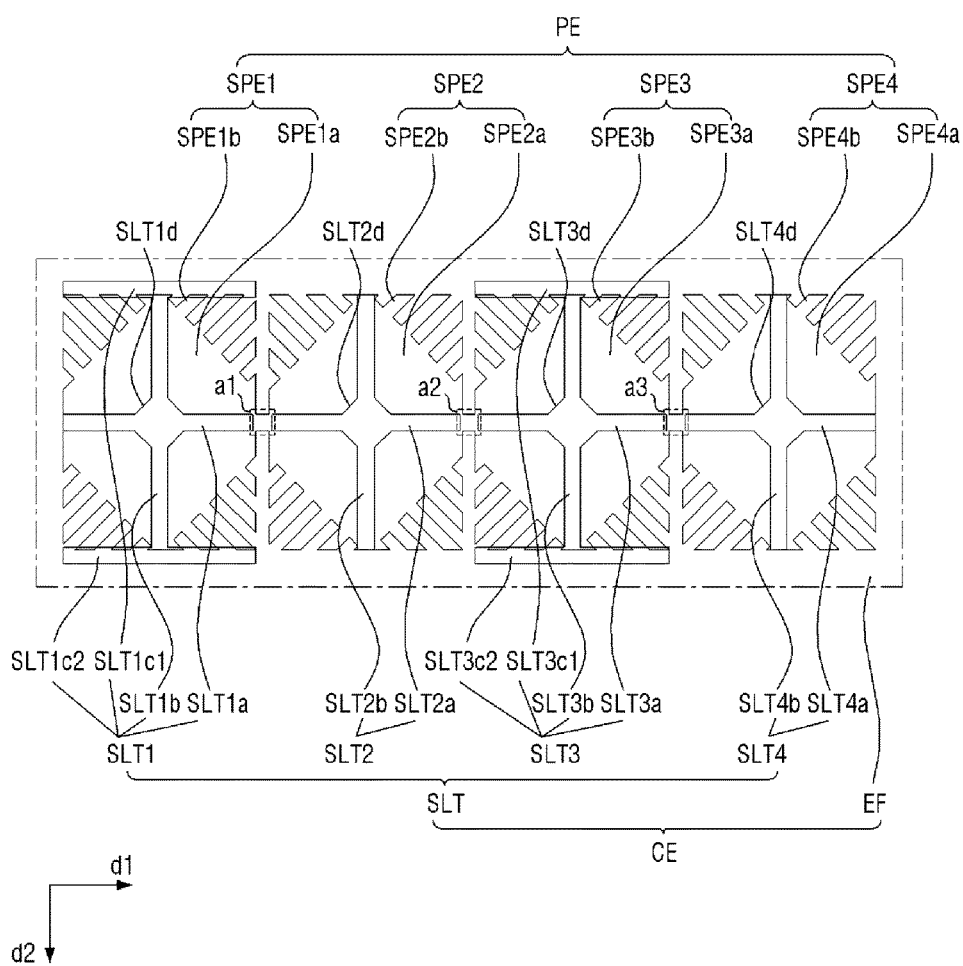

Referring to FIG. 13, in another alternative embodiment, the first and third slit portions SLT1 and SLT3 may include branch portions, and the second and fourth slit portions SLT2 and SLT4 may not include branch portions.

In other alternative embodiments of a liquid crystal display according, branch portions may be defined in two slit portions of the first to fourth slit portions SLT1 to SLT4, and branch portions may not be defined in the remaining two slit portions of the first to fourth slit portions SLT1 to SLT4.

According to the embodiments illustrated in FIGS. 10 to 13, the number of branch portions is smaller than that of the embodiment shown in FIG. 1. Accordingly, misalignment that may be generated when the substrate on which the pixel electrode PE is disposed is bonded to the substrate on which the common electrode CE is disposed may be reduced to about ±2 μm. In such an embodiment, the transmittance reduction due to misalignment may be effectively prevented.

Figure 14:
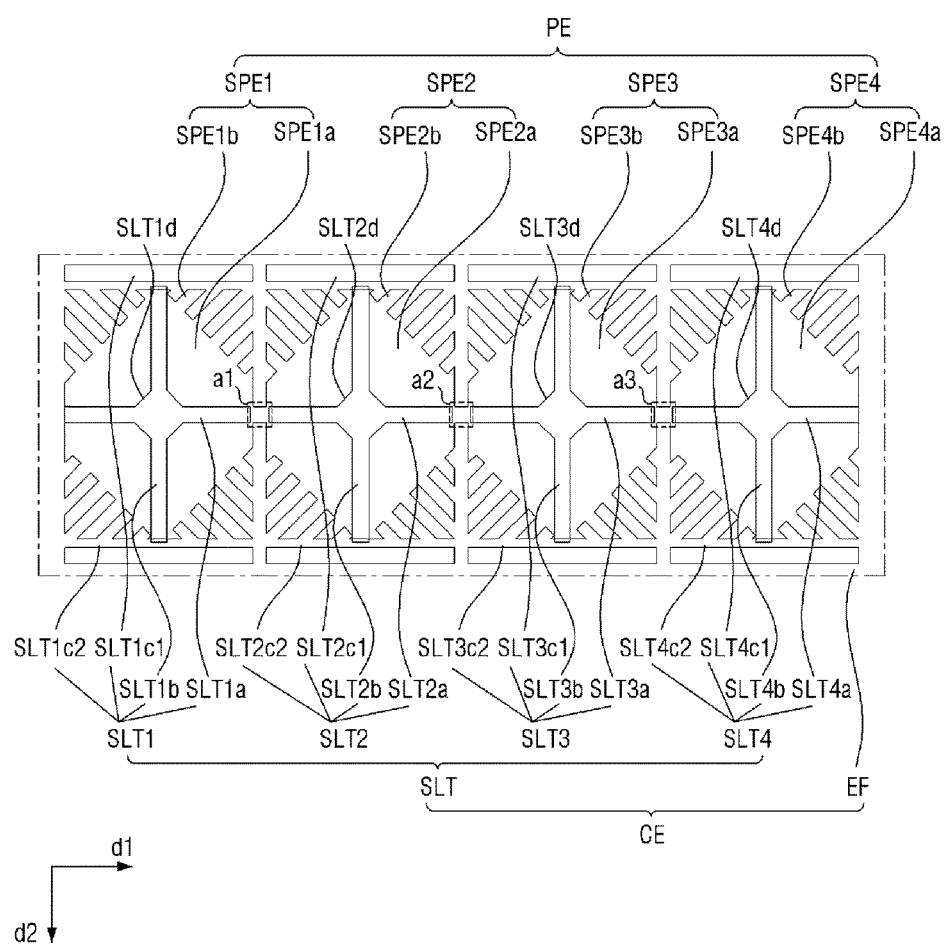

Referring to FIG. 14, in another alternative embodiment, the first branch portion SLT1c1 may be located on one side in the longitudinal direction of the second stem portion SLT1b, and may be spaced apart by a predetermined distance from the one side of the second stem portion SLT1b. In such an embodiment, the second branch portion SLT1c2 may be located on the other side in the longitudinal direction of the second stem portion SLT1b, but may be spaced apart by a predetermined distance from the other side of the second stem portion SLT1b. Accordingly, the first branch portion SLT1c1 may not overlap the second stem portion, and the second branch portion SLT1c2 may not overlap the second stem portion.

Alternatively, although not shown in the drawings, only one of the first branch portion SLT1c1 and the second branch portion SLT1c2 may not overlap the second stem portion SLT1b, and the other branch portion may overlap the second stem portion SLT1b.

In such an embodiment, the second to fourth slit portions SLT2 to SLT4 may have the same shape as the first slit portion SLT1. However, it is not limited thereto, and the branch portion included in at least one slit portion of the second to fourth slit portions SLT2 to SLT4 may not overlap the stem portion.

Although some exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A liquid crystal display device comprising:
   a first substrate;
   a pixel electrode comprising: a first sub-pixel electrode; and disposed on the first substrate;
   a second substrate facing the first substrate; and
   a common electrode comprising: an electric field forming portion; and a first slit portion, and disposed on the second substrate,
   wherein the electric field forming portion comprises a transparent conductive material,
   wherein the first slit portion comprises:
      a first stem portion extending in a first direction;
      a second stem portion extending in a second direction, which is different from the first direction, and crossing the first stem portion; and
      a branch portion extending in the first direction and located on at least one of two opposing sides in a longitudinal direction of the second stem portion, and
   wherein each of the first stem portion and the branch portion has a linear shape surrounded by the electric field forming portion.

2. The liquid crystal display device of claim 1, wherein a width of an end of at least one of the first stem portion and the branch portion is equal to a width of an opposing end thereof.

3. The liquid crystal display device of claim 1, wherein the branch portion comprises:
   a first branch portion located on one of the two opposing sides in the longitudinal direction of the second stem portion; and
   a second branch portion located on the other of the two opposing sides in the longitudinal direction of the second stem portion.

4. The liquid crystal display device of claim 3, wherein the first branch portion is spaced apart by a predetermined distance from the one of the two opposing sides in the longitudinal direction of the second stem portion, and the second branch portion is spaced apart by a predetermined distance from the other of the two opposing sides in the longitudinal direction of the second stem portion.

5. The liquid crystal display device of claim 1, wherein the first slit portion further comprises a first central portion located on an area where the first and second stem portions intersect each other,
   wherein the first slit portion consists of the first central portion, the first stem portion, the second stem portion and the branch portion.

6. The liquid crystal display device of claim 1, further comprising:
   a first scan line extending in the first direction;
   a second scan line extending in the first direction and adjacent to the first scan line; and
   a first data line extending in the second direction.

7. The liquid crystal display device of claim 6, wherein the pixel electrode further comprises a second sub-pixel electrode adjacent to the first sub-pixel electrode, and the first and second sub-pixel electrodes are arranged in the first direction.

8. The liquid crystal display device of claim 1, wherein the first sub-pixel electrode comprises:
   a first plate-shaped portion overlapping the first slit portion; and
   a plurality of first extending portions extending from the first plate-shaped portion.

9. The liquid crystal display device of claim 8, wherein the first plate-shaped portion has a rhombus-like shape.

10. A liquid crystal display device comprising:
    a first substrate;
    a pixel electrode disposed on the first substrate in a first direction and comprising first and second sub-pixel electrodes adjacent to each other;
    a second substrate facing the first substrate; and
    a common electrode disposed on the second substrate and comprising:
       an electric field forming portion comprising a transparent conductive material;
       a first slit portion overlapping the first sub-pixel electrode; and
       a second slit portion overlapping the second sub-pixel electrode,
    wherein each of the first and second slit portions comprises:
       a first stem portion extending in the first direction; and
       a second stem portion extending in a second direction, which is different from the first direction, and crossing the first stem portion,
    wherein at least one of the first and second slit portions further comprises:
       a first branch portion extending in the first direction and located on at least one of two opposing sides in a longitudinal direction of the second stem portion of the at least one of the first and second slit portions, and
    wherein each of the first stem portion and the first branch portion has a linear shape surrounded by the electric field forming portion.

11. The liquid crystal display device of claim 10, wherein a width of one end of at least one of the first stem portion and the first branch portion is equal to a width of an opposing end the at least one of the first stem portion and the first branch portion.

12. The liquid crystal display device of claim 10, wherein the pixel electrode further comprises:
    a third sub-pixel electrode adjacent to the second sub-pixel electrode; and
    a fourth sub-pixel electrode adjacent to the third sub-pixel electrode, the common electrode further comprises:
- a third slit portion overlapping the third sub-pixel electrode; and
- a fourth slit portion overlapping the fourth sub-pixel electrode, each of the third and fourth slit portions comprises:
- a third stem portion extending in the first direction; and
- a fourth stem portion extending in the second direction and crossing the third stem portion, and at least one of the third and fourth slit portions further comprises a second branch portion extending in the first direction and located on at least one of two opposing sides of the fourth stem portion of the at least one of the third and fourth slit portions.

13. The liquid crystal display device of claim 12, wherein each of the third stem portion and the second branch portion has a linear shape surrounded by the electric field forming portion.

14. The liquid crystal display device of claim 12, wherein a width of an end of at least one of the third stem portion and the second branch portion is equal to a width of an opposing end thereof.

15. The liquid crystal display device of claim 12, wherein at least two of the first to fourth slit portions have the same shape as each other.

16. The liquid crystal display device of claim 10, further comprising:
- a scan line extending in the first direction on the first substrate; and
- a data line extending in a second direction different from the first direction on the scan line.

17. The liquid crystal display device of claim 10, wherein the first sub-pixel electrode comprises:
- a first plate-shaped portion overlapping the first slit portion; and
- a plurality of first extending portions extending from the first plate-shaped portion, and the second sub-pixel electrode comprises:
- a second plate-shaped portion overlapping the second slit portion; and
- a plurality of second extending portions extending from the second plate-shaped portion.

18. The liquid crystal display device of claim 10, wherein at least one of the first and second plate-shaped portions has a rhombus-like shape.

19. The liquid crystal display device of claim 10, wherein the first branch portion is spaced apart by a predetermined distance from a side in the longitudinal direction of the second stem portion.

20. The liquid crystal display device of claim 10, further comprising:
- a black matrix disposed on the second substrate; and
- a color filter disposed on the black matrix, wherein the common electrode is disposed on the color filter.

* * * * *